July 28, 1942.  R. A. GOEPFRICH  2,291,033
FLUID PRESSURE CONTROL DEVICE
Filed Sept. 20, 1939  2 Sheets-Sheet 1

INVENTOR.
RUDOLPH A. GOEPFRICH
BY Jerome Q. Cox.
ATTORNEY.

July 28, 1942.　　　R. A. GOEPFRICH　　　2,291,033
FLUID PRESSURE CONTROL DEVICE
Filed Sept. 20, 1939　　　2 Sheets-Sheet 2
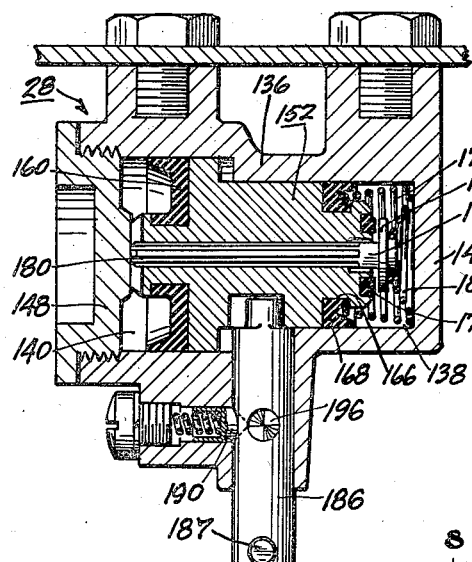
FIG. 4
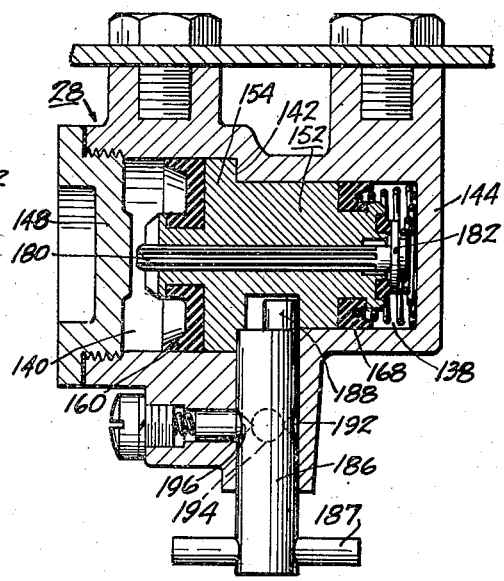
FIG. 5
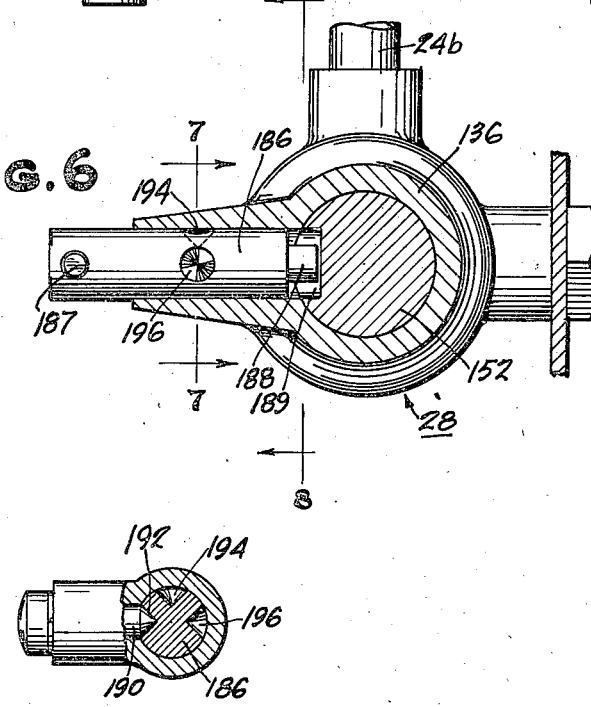
FIG. 6
FIG. 7
FIG. 8
INVENTOR.
RUDOLPH A. GOEPFRICH
BY Jerome R. Cox.
ATTORNEY.

Patented July 28, 1942

2,291,033

UNITED STATES PATENT OFFICE 2,291,033

FLUID PRESSURE CONTROL DEVICE

Rudolph A. Goepfrich, South Bend, Ind., assignor to Bendix Aviation Corporation, South Bend, Ind., a corporation of Delaware Application September 20, 1939, Serial No. 295,758

11 Claims. (Cl. 137—139)

This invention relates to fluid pressure braking systems and more particularly to braking systems which may be altered to cope with the changing road surface conditions.

The present application is a continuation in part of my prior application, Serial No. 152,054, filed July 6, 1937, now Patent No. 2,207,173 of July 9, 1940, and which is in turn a divisional application of my prior application, Serial No. 144,117, filed May 22, 1937, also pending.

Broadly the invention comprehends a fluid pressure braking system for motor vehicles embodying means for varying the braking effect of the front wheels with respect to the braking effect of the rear wheels.

An object of the invention is to provide a fluid pressure braking system for a motor vehicle operative to change the ratio of the braking effect between the brakes associated with the rear wheels of the vehicle and the brakes associated with the front wheels of the vehicle.

Another object of the invention is to provide a fluid pressure braking system for motor vehicles operative to automatically change the ratio of the braking effect between the brakes associated with the rear wheels of a vehicle and the brakes associated with the front wheels of the vehicle.

Another object of the invention is to provide a fluid pressure braking system operative to automatically reduce proportionately the ratio of the braking effect of the brakes associated with the front wheels of the vehicle.

Still another object of the invention is to provide a fluid pressure braking system with means to (a) apply all of the brakes associated with the wheels of the vehicle with equal pressure, or (b) automatically reduce proportionately the ratio of the braking effect of the brakes associated with the front wheels to the effect of the brakes associated with the rear wheels, or (c) apply the rear wheels only with no pressure whatsoever applied to the front wheel brakes.

A feature of this invention is to provide a double diameter piston reciprocally mounted in a double diameter cylinder with valve means controlling a passage through said piston and manually operable means governing the movement and position of the piston.

Other objects and features of the invention will appear from the following description taken in connection with the drawings forming a part of this specification, in which—

Figure 4 is a sectional view taken substantially on the line 2—2 of Figure 1 with the manual control handle turned ninety degrees in a counter-clockwise direction from the positions shown in Figures 1 and 2.

Figure 5 is a sectional view similar to Figure 4 with the control handle turned another ninety degrees also in a counter-clockwise direction;

Figure 6 is a sectional view taken substantially on the line 6—6 of Figure 1;

Figure 7 is a sectional view taken substantially on the line 7—7 of Figure 6 showing the detent and recesses of the cam means for positioning the piston; and Figure 8 is a fragmentary sectional view taken substantially on the line 8—8 of Figure 6 showing the cam and cam recesses in the piston.

Figure 1:
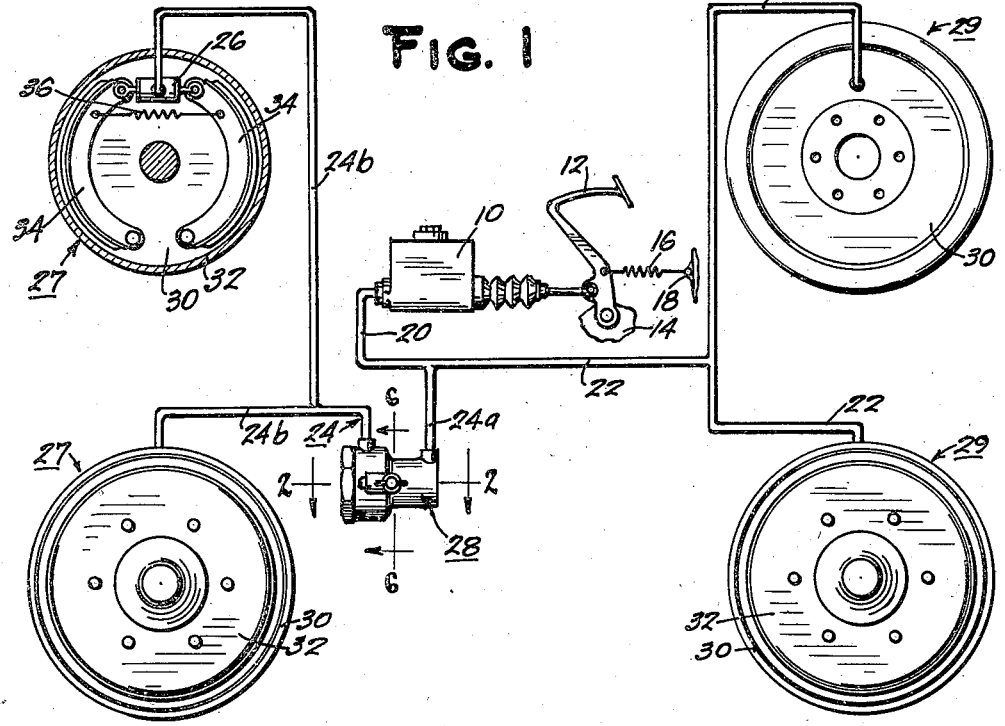
Figure 1 is a diagrammatical illustration of a fluid pressure braking system embodying the invention.

Referring to the drawings for more specific details of the invention, 10 represents a fluid pressure producing device for an automotive vehicle. The device 10 is of the conventional hydraulic type adapted to be actuated by a foot pedal lever 12 pivoted on a suitable support 14 and connected by a retractile spring 16 to a fixed support 18.

A fluid pressure delivery pipe or conduit 20 suitably connected to the fluid pressure producing device 10 has branches 22 and 24 connected respectively to fluid pressure actuated motors 26 arranged in pairs, one pair for actuating the brakes 27 associated with the front wheels of the vehicle and another pair for actuating the brakes 29 associated with the rear wheels of the vehicle; and suitably connected in the fluid pressure delivery pipe or conduit 24 (which is arranged for delivering fluid under pressure to the fluid pressure actuated motors associated with the front wheels of the vehicle) between its section 24a and 24b is my pressure control and ratio reducing mechanism 28, the purpose of which will hereinafter appear.

The brakes may be of conventional type each including a fixed support or backing plate 30 adapted to be secured to an axle or to an axle housing, a rotatable drum 32 associated with the backing plate 30 and adapted to be secured to a rotatable wheel, a pair of friction elements or shoes 34 pivoted on the backing plate 30, and one of the motors 26 being mounted on the backing plate between the friction elements or shoes 34 and operative to spread the shoes into engagement with the drum 32 against the resistance of a retractile spring 36 connecting the shoes.

The pressure controlling mechanism 28, shown in detail in Figures 2, 3, 4, and 5, comprises a double diameter cylinder 136 which includes a small chamber 138 and a large chamber 140 arranged concentrically to and in direct communication with the smaller chamber 138 and providing at its junction with the smaller chamber an annular shoulder 142. The small chamber 138 is closed by an integral head 144 and the chamber has in its wall adjacent the head a port 146 adapted to be connected to section 24a of the fluid pressure delivery pipe or conduit 24. The large chamber 140 is closed as by a removable head 148 and has in its wall adjacent its head a port 150 adapted to be connected to the section 24b of the fluid pressure delivery pipe 24.

A piston 152 reciprocable in the cylinder 136 has on one end a head 154 fitted in the large chamber 140. The head 154 has an extension 156 provided with a circumferential slot 158. A sealing cup 160 seated on the head 154 has a lip fitted in the slot 158 so as to retain the cup against displacement. The head 162 has an extension 164 provided with a circumferential slot 166. A sealing cup 168 seated on the head 162 has a lip fitted in the slot 166, and a spring 170 interposed between the cup and the head 144 normally retains the piston against the head 148. The extension 164 also has a groove 171 in its face in which is fitted a valve seat 172.

The piston 152 has an axial passage 174 intercepted by a transverse slot 176 at the end of the extension 156. This passage and slot provide a communication between the chamber 138 and the chamber 140. A valve 178 for controlling the communication has a slotted stem 180 reciprocable in the passage and a head 182 moved for cooperation with the valve seat 172. A spring 184 interposed between the valve 178 and the head 144 of the cylinder urges the valve to its seat, and the stem 180 of the valve is adapted to abut the head 148 to move the valve from its seat.

A cam shaft 186, provided with a handle 187 (see Figure 2) mounted in a wall of the cylinder 136 has a cam 188 adapted to engage the side walls of a recess 189 formed in piston 152 and at times hold or lock the piston against movement, and a spring-pressed pin or detent 190 is adapted to cooperate with a plurality of notches 192, 194, and 196 (see Figure 7) in the cam shaft for retaining the cam shaft in either of the locked or the disengaged position.

Figures 2, 3:
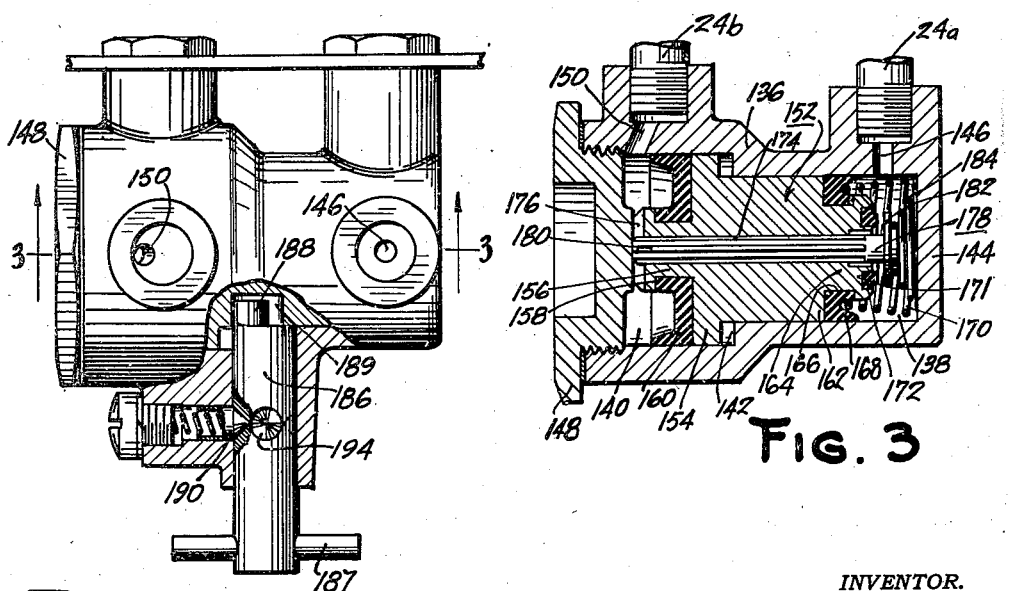
Figure 2 is a top plan view partly in section, the portion in section being shown taken substantially on the line 2—2 of Figure 1.
Figure 3 is a sectional view taken substantially on the line 3—3 of Figure 2.

It is to be understood that the piston may be locked into either of two positions, that is, locked in a position in which the piston 152 is forced fully to the left, (see Figures 2 and 3). In this position the valve 178 is maintained open and free flow of fluid is permitted through passage 174. In the other locked position the piston is forced to the right against the shoulder 142 (see Figure 5). In this position the valve 178 is maintained closed being hinged onto its seat 172 by the action of the spring 184 thus closing the passage 174 against fluid flow.

Assume that the system is installed substantially as illustrated and described, and that the ratio reducer 28 connected in the system is unlocked, as shown in Figure 4, under these conditions, upon depressing the foot pedal lever 12 the fluid pressure producing device 10 is actuated to displace fluid therefrom through the fluid pressure delivery pipe 20 and its respective branches into the fluid pressure actuated motors 26, causing actuation of the motors, and this actuation of the motors results in movement of the shoes 34 into engagement with the drums 32 against the resistance of the retractile springs 36.

However equal action is modified versus the mechanism 28, fluid under pressure enters the chamber 138 by way of the port 146 and is displaced therefrom past the valve 178 through the axial passage 174 and passage 176 into the chamber 140, thence through port 150 and the fluid pressure delivery pipe to the fluid pressure actuated motors. When the effective pressure of the fluid in the chamber 140 exceeds the load on the spring 170 plus the effective pressure of the fluid in the chamber 138, the piston 152 moves to the right toward the annular stop shoulder 142 and the valve 178 closes. Upon an increase of the effective pressure of the fluid in the chamber 138, exceeding the difference between the effective pressure of the fluid in chamber 140 and the effect of the springs, the piston 152 moves to the left, and the valve again opens to establish communication between the chambers 138 and 140 by way of the axial passage 174. This action may be repeated, and the result is that a change in the ratio of effectiveness of the two sets of brakes is accomplished because, to create balance over the piston, it is necessary to provide a higher unit pressure in small chamber 138 then in large chamber 140. It is of course to be understood that the effective pressure of the fluid in chamber 140 is usually greater for a given unit pressure than the effective pressure in the chamber 138 for the same unit pressure because of the difference in areas of the two ends of the piston.

Should the piston 152 be positioned to the right against the shoulder 142, as has just been described, and the pressure in the chamber 138 relieved due to the pressure on the brake pedal 12 being lightened or completely removed, fluid under pressure will be trapped in the chamber 140. However, this fluid acts upon the seated or left hand face of the valve 172 to urge the valve from its seat against the relatively light pressure of the spring 194. The trapped fluid is thereby permitted to return to the pressure producing device in the normal manner. Sufficient clearance is provided between the head 144 and the valve 178 to permit the valve 178 to be moved from its seat 172 when the piston 152 is positioned against the stop shoulder 142.

Upon conclusion of a braking operation, the foot pedal lever 12 is released and is automatically returned to its retracted position under the influence of the retractile spring 16. As the foot pedal lever returns to its retracted position, the fluid pressure producing device 10 returns to its position of rest. This results in release of pressure on the fluid in the system, and, accordingly, release of pressure of the fluid in the ratio reducer cylinder whereupon the ratio reducer returns to its normal position and the fluid in the fluid pressure actuated motors 26 and the fluid pressure piping system connecting the motors to the fluid presure device is returned to the fluid pressure device 10 under the influence of the retractile springs 36 connecting the shoes 34 of the respective brake structures.

In operation, the manual setting of the pressure control and the automatic proportional reduction of the ratio of braking effect between the front and rear wheel brakes is accomplished through setting the cam controlling the movement of piston 152.

When normal braking effect is desired, that is, equal braking effect on all of the vehicle wheels and the cam shaft 186 is rotated until spring pressed detent 190 engages recess 192, as shown in Figures 2 and 7. With cam shaft 186 in this position and cam portion 188 presses against the side of cam recess 189 formed in the piston 152 and holds the piston 152 to the left as shown in Figures 2 and 3. Thus the valve 178 is held open and has no effect.

When proportional reduction of the braking effect is required on the front brakes due to slippery, hazardous road surface conditions and other reasons, the manually operated cam shaft 186 is rotated until the spring pressed detent 190 engages the recess 194 in the shaft 186. In this position as shown in Figure 4, the cam 188 does not engage either side of the cam recess 189 in piston 152 and the piston 152 is free to reciprocate and proportion the braking effect of the front wheels with regard to the braking effect of the rear wheels.

There are extreme instances in which the braking effect at the rear wheels only is required. This condition is usually due to the loading of the vehicle, as for instance, a load localized over the rear axle and wheels. When a load such as this is transported it is advisable to brake entirely through the rear wheels. To obtain this braking effect the cam shaft 186 is rotated until the detent 190 engages the recess 196. In this position the cam 188 presses against the right side of cam recess 189 and forces the piston 152 to the right, as shown in Figure 5. With the piston 152 moved to the right against the shoulder 142, the spring 184 urges the valve 178 upon its seat 172 to close the passage 174 through the piston 152 against fluid passage there through to the front brakes. Thus it will readily be seen that movement of the foot pedal 12 with the control mechanism 28 in the position shown in Figure 5 and described above, the rear brakes only will be applied.

Although this invention has been described in connection with certain specific embodiments, the principles involved are susceptible of numerous other applications that will readily occur to persons skilled in the art. The invention is, therefore, to be limited only as indicated by the scope of the appended claims.

Having thus described the various features of the invention, what I claim as new and desire to secure by Letters Patent is—

1. A ratio reducer comprising a double diameter cylinder, a double end piston reciprocable therein having heads complementary to the different diameters of the cylinder, said piston having an axial passage therethrough, and a valve for control of the passage having a stem associated therewith which in one position of the piston contacts the cylinder wall to hold open the valve, and means urging the valve toward closed position.

2. A ratio reducer comprising a cylinder having a small chamber and a large chamber, one chamber having an inlet opening and the other having an outlet opening, a piston having a small head movable in the small chamber and a large head movable in the large chamber and having an axial passage therethrough, and valve mechanism for controlling the passage, said valve mechanism including a valve element for closing the passage and a valve stem connected to the valve element and extending through the passage to contact the cylinder wall when the piston is in a certain position.

3. A ratio reducer comprising a cylinder, a small chamber in one end of the cylinder having an inlet port, a large chamber in the other end of the cylinder, a detachable head on one end of the cylinder, a discharge port in the large chamber, a piston reciprocable in the cylinder having oppositely disposed differential diameter heads, one movable in the large chamber, a passage through the piston, a spring-pressed valve controlling the passage, means for automatically opening the valve whenever the piston assumes a certain position, and a spring interposed between the piston and the head in the small chamber.

4. A ratio reducer comprising a double diameter cylinder, a detachable head on one end of the cylinder, said cylinder having inlet and outlet ports, a piston reciprocable in the cylinder having oppositely disposed heads movable respectively in the complementary parts of the cylinder, an extension on the piston adapted to seat on the detachable head, a spring interposed between the piston and the closed end of the cylinder, said piston having a passage therethrough and a spring-pressed valve controlling the passage having a stem extending through said passage and adapted to cooperate with the detachable head of the large end of the cylinder.

5. A ratio reducer comprising a cylinder, a piston having ends of different areas reciprocable in the cylinder and having a passage therethrough, a valve for controlling the passage in response to differential pressures on the two ends of the piston said valve comprising a head for closing the passage and a stem extending through the passage to position the head in accordance with the relative positions of the piston and cylinder, and means for controlling the position and movement of the piston.

6. A ratio reducer comprising a cylinder, a piston having ends of different areas reciprocable in the cylinder and having a passage therethrough, a valve for controlling the passage in response to differential pressures on the two ends of the piston said valve comprising a head for closing the passage and a stem extending through the passage to position the head in accordance with the relative positions of the piston and cylinder, and manually operable means for controlling the position and movement of the piston.

7. A ratio reducer comprising a cylinder, a piston having ends of different areas reciprocable in the cylinder and having a passage therethrough, a valve for controlling the passage in response to differential pressures on the two ends of the piston said valve comprising a head for closing the passage and a stem extending through the passage to position the head in accordance with the relative positions of the piston and cylinder, and means to maintain the piston at either end of the cylinder.

8. A ratio changer comprising a double diameter cylinder having a discharge passage, and having a valve controlling the pressure at the discharge passage, differential pressure responsive means comprising a stepped piston for opening and closing the valve controlling the pressure at the discharge passage and means to maintain the valve controlling the pressure at the discharge passage open or closed.

9. A ratio changer, a differential pressure responsive means for progressively maintaining a constant ratio between the inlet and outlet pressures comprising a stepped piston having a passage therein controlled by a valve means for controlling the valve in accordance with the position of the piston and a cam for predetermining the freedom of action of said piston.

10. A ratio changer, a differential pressure responsive means for progressively maintaining a constant ratio between the inlet and outlet pressures comprising a stepped piston having a passage therein controlled by a valve means for controlling the valve in accordance with the position of the piston and a cam for predetermining the freedom of action of said piston to maintain said valve either open or closed.

11. A ratio changer comprising a piston having ends of different pressure responsive areas and having a passage therethrough controlled by a valve progressively maintaining a constant ratio between the inlet and outlet pressures and means for optionally providing unimpeded or completely restricted fluid flow between the inlet and outlet ports said valve including a head which closes the passage when the piston is in one position and a stem extending through the passage which prevents the head from closing the passage when the piston is in another position.

RUDOLPH A. GOEPFRICH.